(12) United States Patent
Iverson et al.

(10) Patent No.: US 10,930,071 B2
(45) Date of Patent: Feb. 23, 2021

(54) ADAPTIVE DECIMATION USING 3D VIDEO FEATURES

(71) Applicant: Microsoft Technology Licensing, LLC, Redmond, WA (US)

(72) Inventors: Kristofer N. Iverson, Coupeville, WA (US); Khai Tran, Kirkland, WA (US); Ming Chuang, Bellevue, WA (US); Emmett Lalish, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 15/178,364

(22) Filed: Jun. 9, 2016

(65) Prior Publication Data

US 2017/0358133 A1    Dec. 14, 2017

(51) Int. Cl.
*G06T 17/20* (2006.01)
*H04N 13/106* (2018.01)
*H04N 13/194* (2018.01)
*G06T 3/40* (2006.01)
(Continued)

(52) U.S. Cl.
CPC ............ *G06T 17/205* (2013.01); *G06T 3/403* (2013.01); *G06T 3/4023* (2013.01); *H04N 13/106* (2018.05); *H04N 13/194* (2018.05); *B29C 64/386* (2017.08); *B33Y 50/00* (2014.12); *G06T 2210/08* (2013.01)

(58) Field of Classification Search
CPC ..... G06T 17/205; G06T 3/403; G06T 3/4023; H04N 13/0007; H04N 13/0059
USPC ........ 700/98, 132; 345/420, 633; 348/46, 42
See application file for complete search history.

(56) References Cited

U.S. PATENT DOCUMENTS 6,208,347 B1 * 3/2001 Migdal ................... G06T 17/20
                                                           345/419
7,006,685 B2 * 2/2006 Love ................... G06K 9/00154
                                                           345/419
(Continued)

OTHER PUBLICATIONS

"ISO/IEC 14496-16/DAM2 Multi-resolution 3D mesh Compression", In Proceedings of the International Organisation for Standardisation Organisation Internationale De Normalisation Iso/IecJtc1/Sc29/Wg11, MPEG 2013/N13373, Feb. 4, 2013, 31 Pages.
(Continued)

*Primary Examiner* — Jefferey F Harold
*Assistant Examiner* — Sean N. Haiem

(57) ABSTRACT

Systems, devices, and methods are described herein for geometrically simplifying three-dimensional (3D) video data. In one aspect, a method may include obtaining 3D data, with the 3D data including a plurality of portions associated with a default resolution priority. A higher resolution priority may be associated with one or more portions of the 3D data. Next, portions of the 3D data may be sorted according to resolution priorities associated with each portion, and geometric simplification may be performed on the sorted portions of the 3D data, beginning with portions associated with a least resolution priority and continuing with portions associated with successively higher resolution priorities. The simplified 3D data may be processed, for example, for rendering on a computing device or transmission to another device for display or generation, such as a 3D printing device for generating a 3D object.

20 Claims, 8 Drawing Sheets

(51) Int. Cl.
*B29C 64/386* (2017.01)
*B33Y 50/00* (2015.01)

(56) References Cited

U.S. PATENT DOCUMENTS

| | | | |
|---|---|---|---|
| 8,948,498 B1* | 2/2015 | Hickman | G06T 15/04 |
| | | | 382/154 |
| 9,147,279 B1* | 9/2015 | Bruce | G06T 15/04 |
| 2004/0096098 A1* | 5/2004 | Love | G06K 9/00154 |
| | | | 382/154 |
| 2007/0036434 A1* | 2/2007 | Saveliev | G06K 9/52 |
| | | | 382/173 |
| 2010/0277476 A1* | 11/2010 | Johansson | G06T 17/20 |
| | | | 345/423 |
| 2014/0043436 A1* | 2/2014 | Bell | H04N 13/0203 |
| | | | 348/46 |
| 2015/0009214 A1* | 1/2015 | Lee | G06T 17/10 |
| | | | 345/420 |
| 2015/0351477 A1* | 12/2015 | Stahl | G06T 15/04 |
| | | | 700/132 |
| 2016/0107388 A1* | 4/2016 | Chopra | G05B 19/4099 |
| | | | 700/98 |
| 2016/0129638 A1* | 5/2016 | Bostick | G06F 17/50 |
| | | | 700/98 |
| 2016/0148433 A1* | 5/2016 | Petrovskaya | G06T 19/006 |
| | | | 345/633 |
| 2017/0217152 A1* | 8/2017 | Cempa | B41F 15/46 |

OTHER PUBLICATIONS

"International Search Report and Written Opinion Issued in PCT Application No. PCT/US17/034922", dated Sep. 20, 2017, 17 Pages.

* cited by examiner

ADAPTIVE DECIMATION USING 3D VIDEO FEATURES

TECHNICAL FIELD

This disclosure relates generally to three dimensional (3D) modeling, and more specifically to simplifying 3D image and video data based on at least one of certain features in the 3D data or target device capabilities.

BACKGROUND

High quality, high resolution meshes, such as 3D image and video data, are ubiquitous, thanks to the advance in 3D reconstruction and modeling techniques. In their original forms, however, the models may not be suitable for various consumption scenarios, due to the excessive complexity and data bandwidth. For example, in a playback scenario where an animated mesh sequence is expected be streamed over the internet, any requirement of data bandwidth over 20 Mbps becomes impractical (while many raw meshes available currently can be easily over 1000 Mbps). Another example is 3D printing applications, where an overly complicated mesh can take a prohibitive time to print, with an underperforming quality, due to mechanical/physical constraints of the 3D printer.

A common solution to this issue is mesh decimation and other geometric simplification techniques. Mesh decimation, for example, simplifies the model complexity (e.g., by reducing the number of triangles or other shapes used), while preserving its geometry fidelity as much as possible (for example, a finely tessellated flat square patch, can be perfectly represented by using only two triangles instead). The prevalence of decimation routines in the open source world has made it possible for almost anyone to simplify a model—apps like MeshLab, and frameworks like Babylon.js provide implementations of mesh simplification. However, these approaches follow a standard approach using common tuning parameters in a one-size fits all approach. Traditionally, this is done by algorithms designed with a mathematical error metric in mind, which typically includes the integration/accumulation of the volume difference before and after decimation. During the process, the error metric is used to determine whether a triangle can be removed without introducing too much geometric errors. In general, these methods achieve decent decimation quality, in the sense that the final geometry represented by the decimated mesh well approximates the original geometry globally.

One problem with these blind/generic approaches, however, is that such globally optimized geometry may not be optimal contextually for the target consumption scenario. Accordingly, improvements in geometric simplification processes can be made.

SUMMARY

Illustrative examples of the disclosure include, without limitation, methods, systems, and various devices. In one aspect, techniques for geometrically simplifying three-dimensional (3D) video data may include obtaining 3D data, with the 3D data including a plurality of portions associated with a default resolution priority. A higher resolution priority may be associated with one or more portions of the 3D data. Next, portions of the 3D data may be sorted according to resolution priorities associated with each portion, and geometric simplification may be performed on the sorted portions of the 3D data, beginning with portions associated with a least resolution priority and continuing with portions associated with successively higher resolution priorities. The simplified 3D data may be processed, for example, for rendering on a computing device or transmission to another device for display or generation, such as a 3D printing device for generating a 3D object.

Other features of the systems and methods are described below. The features, functions, and advantages can be achieved independently in various examples or may be combined in yet other examples, further details of which can be seen with reference to the following description and drawings.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Figure 1:
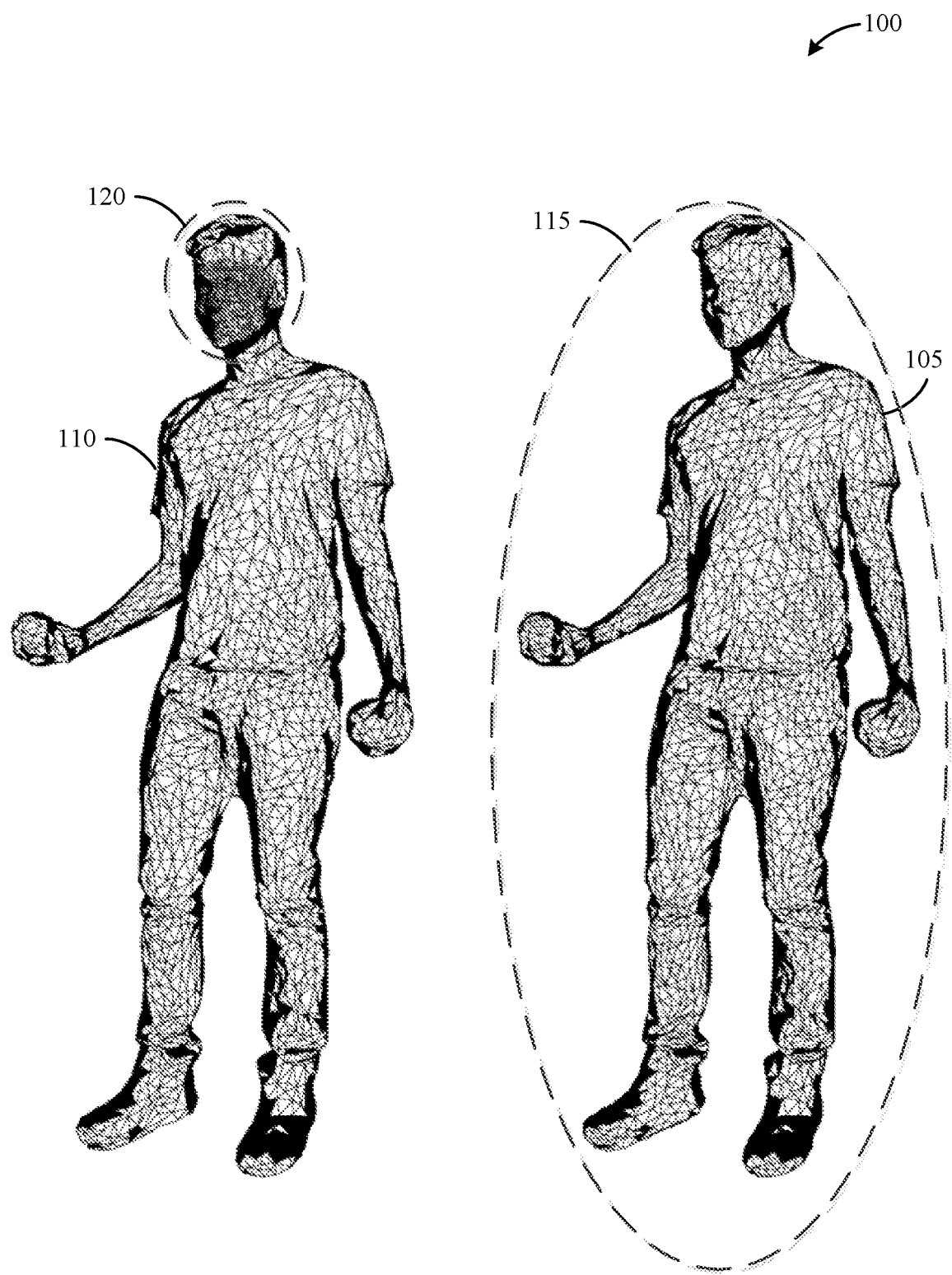
FIG. 1 depicts two examples of 3D image data representing a person, one represented by a mesh according to standard decimation techniques, and one represented by a mesh according to the described adaptive decimation techniques.

Systems and techniques are described herein for implementing a more progressive approach to geometric simplification of 3D image data, such as mesh decimation, to produce higher quality and more visually appeal 3D models/objects and/or for streaming purposes. More specifically, this disclosure describes several techniques for performing geometric simplification on 3D mesh data, for example, extracted or generated from 3D video data, utilizing unique data in the 3D video stream to arrive at a simplified model that is much higher quality than one would achieve using off the shelf decimation algorithms currently available. The described techniques may be most useful, in particular, for 3D printing, where 3D video information along with 3D printer capabilities may be applied to automatically select a simplification that achieves the highest quality result. However, this same approach may equally be used with any target device able to describe its capabilities in advance of the application of a geometric simplification process, such as for example, low-resolution display devices and the like.

As described herein, geometric simplification may be a form of 3D compression such that it may be common to reduce 3D mesh or video data including 1.5 million triangles or other shapes to approximately 10-20 thousand triangles or other shapes during streaming, or similarly significant size reduction. However, current techniques may not retain higher fidelity in more sensitive portions of the 3D data, thus not providing an optimized solution for streaming simplified 3D data. The techniques described herein may be used to selectively simplify 3D mesh data for streaming purposes. The described techniques may be adaptable, such that greater simplification may be achieved with higher resolution retained in sensitive or identified areas of the 3D data. Stated another way, the process may be more aggressive, while preserving high fidelity areas, to ensure the highest level of compression with the least reduction in quality, thus saving money, time, and storage space.

In one aspect, the described techniques may include selecting a key frame from 3D video data and transforming it into a much smaller thumbnail, for example. High resolution texture may be stored in the video data, and may be applied to the 3D video data after decimation has been performed, to produce higher quality/resolution video data. Variable layer thickness may be influenced by 3D video features, such as faces, hands, etc. In the case of a streaming, key frame data may be used and updated based on deltas, to further the amount of 3D compression implemented without degradation in resolution.

Another example application of the described techniques includes modifying 3D mesh data, e.g., via geometric simplification/decimation, for low-end or low-resolution displays, such that the 3D data may be reduced to correspond to the highest resolution capable on the display, thus providing the highest quality images possible, while still enabling 3D data compression. In some instances, an aggressively decimated model may be backed by the original high quality model so that the low-poly version is available as a quick preview when needed. The original model may be retained so that it is still available.

In a first aspect, certain aspects or features of the 3D video data/mesh data may be automatically detected. The features may correspond to certain regions, e.g., high priority regions, of the 3D image data, such as a face of a person, curves in any of a number of objects, or other areas preconfigured or selected as having a higher priority for retaining higher resolution. In some aspects, either in addition to or in place of automatic detection, a user interface may be provided that enables manual selection of areas, features, etc., of the 3D image data to be modeled or generated having a higher resolution or fidelity than surrounding areas, for example. In either example, upon receiving or obtaining 3D image/video data, the 3D data may be converted into a 3D mesh that defines one or more 3D objects via lines connected at vertices. The cost, such as geometric cost or error cost, for deleting each line or segment of the 3D mesh may then be computed. The cost may represent how much error would be added to the 3D model if a segment were deleted. Next the higher priority regions associated with a preferred higher resolution or fidelity may be identified (e.g., automatically, through inputs received via a user interface, or a combination thereof). The cost of deleting segments or lines associated with the higher priority regions may then be scaled, such that the error cost associated with segments associated with the high priority regions may be increased. The segments may then be sorted according to cost. Segments having the lowest cost may be deleted or collapsed first, in order to simplify the geometry of the 3D mesh. Segments progressively having more error cost may be collapsed until a threshold or target simplification (e.g., in number of vertices or line segments), is reached. In some aspects, the location of one or more vertices may be adjusted after the collapsing process, for example, to reduce the error associated with the resulting simplified m3D mesh.

In some aspects, identifying resolution priority regions may be done automatically. In one example, configuration parameters for identifying resolution priority regions may be received via a user interface, for example, identifying portions, features, regions, visual attributes, etc., of 3D objects for higher priority resolution retention. Upon configuration, visual assets meeting the criteria for higher resolution priority may be detected. In some cases, variable priority or weight may be given to different regions or features, for example, to enable an even more adaptive geometric simplification process.

In some aspects, 3D mesh data may be simplified based, additionally or alternatively, on target device capabilities or specifications, such as a 3D printer or a low-resolution display device, for example. In some cases, this may include simplifying the 3D mesh to align with or correspond to one or more layer heights of a 3D printer, x-y dimensional accuracy of a 3D printer, or resolution or size of a display device. In some cases, the location of one or more vertices may also be adjusted, after the segment collapsing process, to further align the simplified 3D mesh with device/3D printer capabilities.

In one aspect, texture associated with a 3D object or 3D video/image data may also be used to inform the mesh simplification process. In one example, a 3D mesh may be simplified to correspond to a resolution of texture associated with the mesh. This may include determining a resolution of all or a portion of texture associated with a 3D mesh, connecting the texture to faces or surfaces of the 3D object, comparing the texture resolution to the resolution of the 3D mesh, and simplifying the mesh (e.g., collapsing lines within the mesh), where the mesh resolution exceeds the texture resolution.

FIG. 1 depicts diagram 100 illustrating example 3D meshes 105 and 110 of a person. 3D mesh 105 may include a homogenous or uniform resolution mesh 115, for example made up of 10 k segments, which was produced from a more complex 3D data via traditional mesh decimation techniques. However, this type of decimation may result in a non-desirable model, such that the facial expression is not readily discernable, for example, by trying to preserve a higher global geometric accuracy. According to the techniques described herein, 3D mesh 110 may be produced by adaptively incorporating user-prescribed constraints/preferences into the traditional error metric used to drive mesh decimation. This results in an adaptive decimation system whose output is tailored/customized toward the customer need. For example, 3D mesh 110 may include one or more regions 120, designated or detected as corresponding to higher desired resolution or detail. In the example illustrated, region 120 corresponds to the face of the person represented by 3D mesh 110. Region(s) 120 may include areas where a user prescribes the constraint to preserve the facial region of the mesh more rigorously, which naturally results in more triangle budgets spent on the facial area. At a high level, this is done by nonlinearly scaling up the traditional error metric (in the face), such that the system needs to pay more cost when removing triangles from the area.

Figure 2:
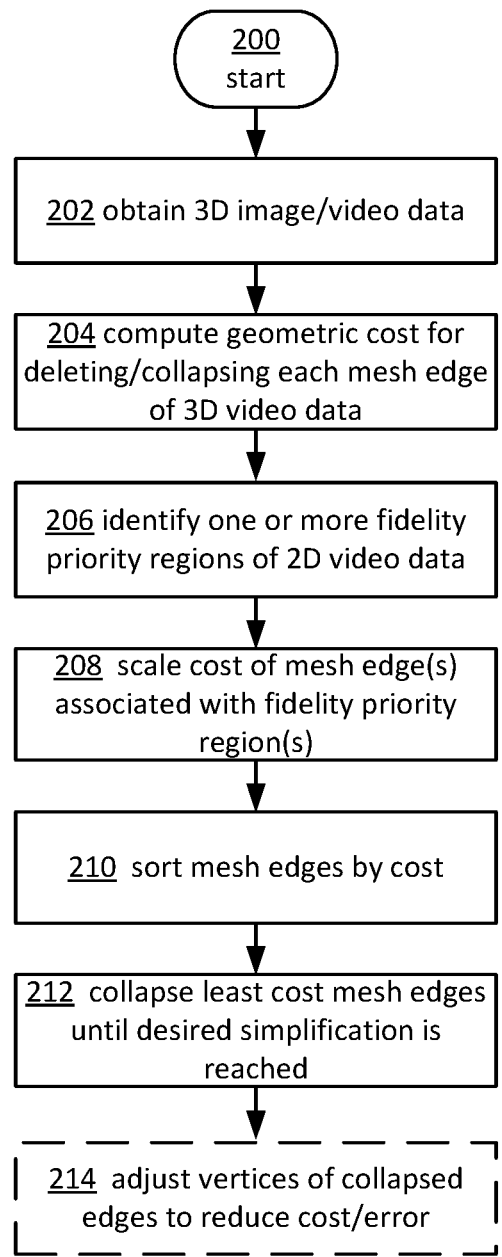
FIG. 2 depicts an example operational procedure for dynamically simplifying 3D image data represented by a mesh based on priority regions in the mesh.

FIG. 2 illustrates an example process 200 for adaptively geometrically simplifying a 3D mesh, for example, that represents a 3D object. In some aspects, the 3D mesh may be generated from 3D video data. Process 200 is based on the classical QEM-based iterative decimation approaches. At its most generic form, the idea of these earlier works is to compute a geometric cost for each mesh edge. The cost describes how much geometric error/deviation would be introduced, if two incident triangles or other shapes were deleted by collapsing a common edge. Once such a cost is defined, the edges may be sorted based on their costs, and then triangles or other shapes (square or polygon having any number of sides, for example) may be removed iteratively by successively choosing the edge with the least cost. The process stops when the target amount of triangles or other shapes is reached.

There are several possible ways for defining the cost, as are known in the art. But the cost determination, in and of itself, does not take into account the contextual preference or relevance of certain triangles or edges, and is blindly aimed for reducing geometric errors globally equivalently. Process 200, and in some aspects, processes 400, 600, and 700 described below, use the typical QEM cost, but scaled/multiplied according to the user prescribed constraints/preference. For the areas indicated or selected as contextually important, the costs of the edges from those areas may be multiplied with a tunable parameter (i.e., the larger the multiplier is, the more rigorously the algorithm would try to preserve the geometry fidelity in those areas). Using this strategy, the output can be tailored/customized for difference needs or preferences.

It is worth noting that removing an edge is equivalent to merging two vertices. In some aspects, the position of the new vertex needs to be recomputed such that it satisfies certain criterion. In the traditional methods, this is typically done by adjusting the vertex position such that, again, the resulting geometric error is minimized. Hence, a second improvement to traditional methods includes determining the new position to satisfy any of a number of user constraints (if any). One example of this is for the 3D printing application, such that the new position may be aligned with the quantized 3D coordinate system of the 3D printer to maximize output quality while conserving resources in the process.

As such, process 200 depicts a specific implementation of an adaptive or selective decimation or other mesh simplification process. It should be appreciated that process 200 may be performed, in some cases, by a client computing device, such as a PC, laptop, tablet, or smart phone or other mobile device, in part by one or more remote devices via one or more communication links, servers, virtualized assets, and so on.

Process 200 may begin at operation 202, where 3D video or image data may be obtained. Operation 202 may include capturing multiple frames of a single 3D object, for example, from 3D video. In other cases, the 3D data may be image data, for example from a 3D modeling application, or from other sources. The 3D data, if not already, may be converted or represented by a 3D mesh. Next, at operation 204, the geometric cost/error may be computed for collapsing each mesh edge or triangle of the 3D data. Next, at operation 206, one or more regions, features, assets, etc., may be identified as associated with a higher priority region for maintaining fidelity/higher resolution. Mesh edges/tri- angles associated with the higher priority region(s) may then be scaled, such that the cost of removing edges/triangles in these regions is higher, at operation 208. Next, all of the mesh edges/triangles may be sorted according to cost or error contribution, at operation 210. Mesh edges may then be collapsed or combined, starting with the edge or triangle associated with the least cost, and proceeding to subsequent edges/triangles in order of ascending cost, until a described simplification or object resolution is reached, at operation 212.

In some cases, process 200 may also include operation 214, where vertices of resulting edges/triangles or other shapes remaining in the 3D mesh after the simplification process, may be adjusted or moved, for example, to reduce cost/error of the simplification.

Figure 3:
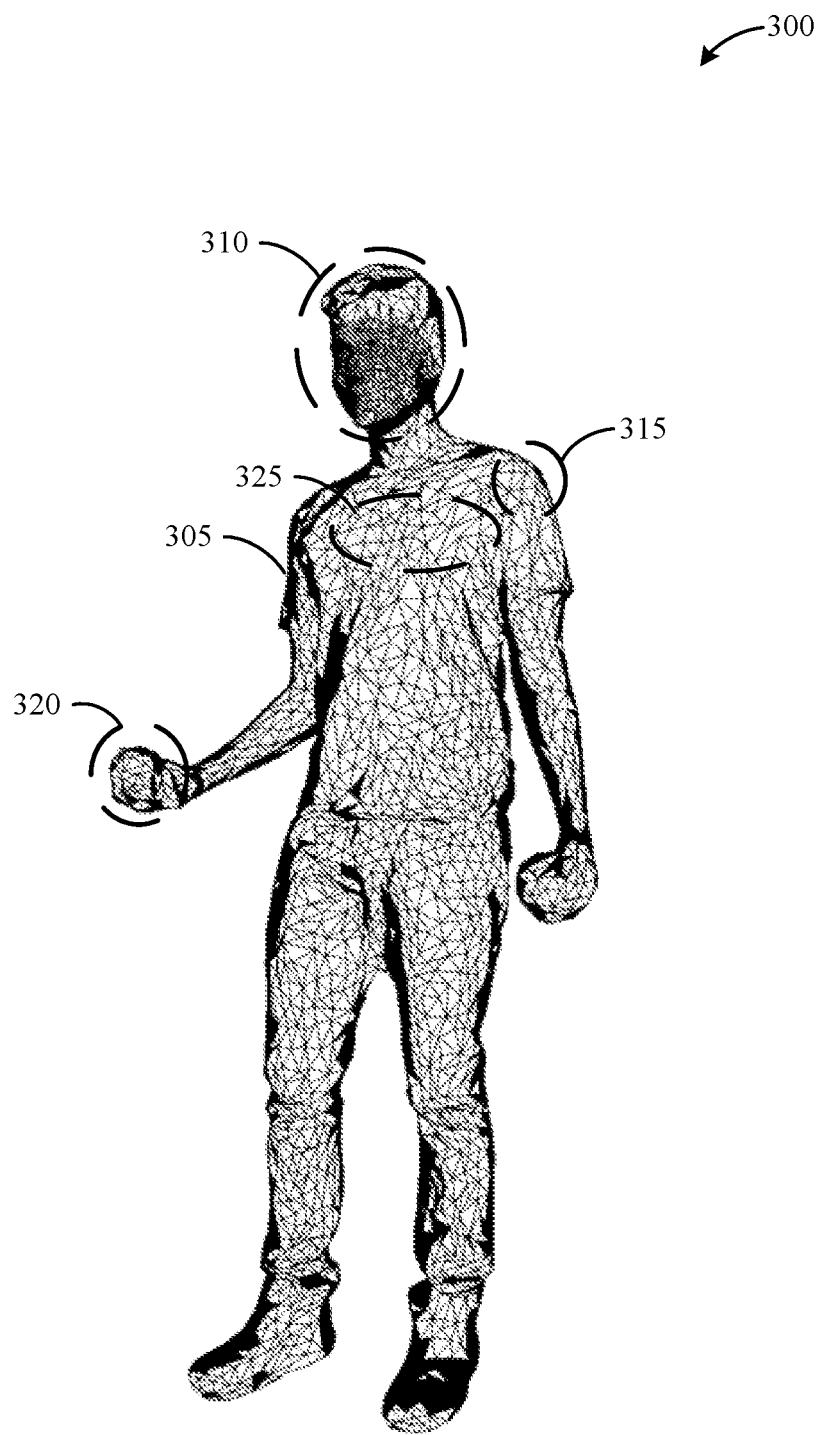
FIG. 3 depicts an example of 3D image data representing a person, with priority regions indicated via areas.

FIG. 3 illustrates another example 300 of a 3D object representing a person 305. 3D object 305 may have various features that may be more important to preserve in terms of resolution or fidelity, such as a face region 310, a hand or other body part 320, for example holding a small object, may have various curves 315, the accuracy of which may improve the overall visual appearance of the 3D object, text areas 325, and so on. It should be appreciated that any of a variety of features, either specific to, or agnostic to, certain types of classifications of objects, may be configured to be assigned a higher resolution priority. In some cases, these areas or features may be manually selected by a user, for example, via a user interface, such as user interface 500 described below in reference to FIG. 5. In another example, features may be automatically detected.

Information may be encoded in the 3D video indicating areas in a 3D mesh that are sensitive, high-quality, and should receive high-fidelity treatment. Often this information may be added by people editing the video to ensure compression without loss of important details. However, this could be an automatic mechanism using face recognition or other forms of automated asset detection. Once an area of a mesh is tagged, the underlying decimation algorithm may take advantage of this information. This may be a weight, indicating to what extent the algorithm needs to throttle back, or an explicit flag indicating not to touch a specific area of the mesh. The algorithm may be able to identify these areas, perform decimation on the larger mesh, avoiding the tagged area, and ensuring a high fidelity connection between the two areas.

Figure 4:
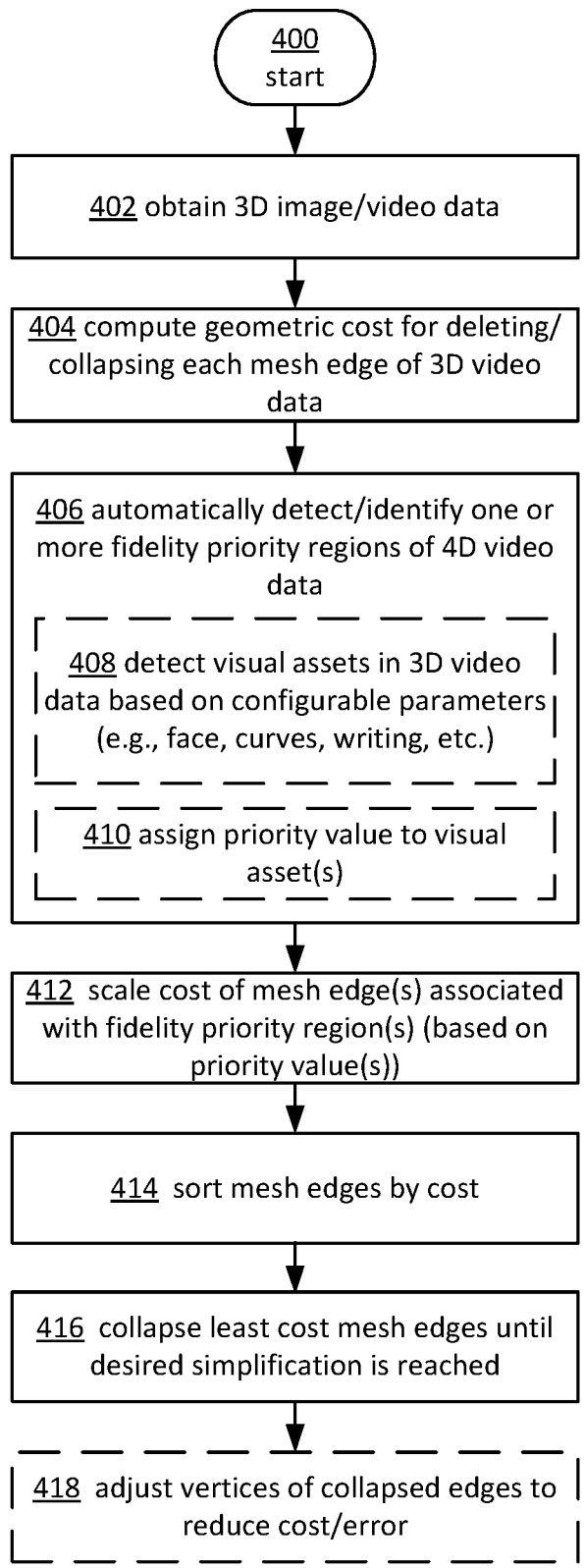
FIG. 4 depicts an example operational procedure for dynamically simplifying 3D image data represented by a mesh based on detected priority regions in the mesh.

FIG. 4 illustrates an example process 400 for automatically detecting higher resolution priority regions of a 3D object/3D mesh and performing a geometric simplifications process similar to process 200 described above. In some examples, various operations of process 400 may be similar to similarly labeled operations of process 200. In these cases of similarity, the common operations will not be described in great detail again here.

After obtaining 3D image/video data, converting the data to a 3D mesh, and computing a geometric cost/error for collapsing each edge/triangle in the mesh (operations 402 and 404, respectively), high fidelity regions of the 3D mesh may be automatically detected at operation 406. In some cases, operation 406 may further include detecting visual assets in the 3D mesh/data based on configurable parameters. In some cases, the configurable parameters may include face detection, curve identification, text identification, object specific features based on object identification, and other similar types of asset detection based on image analysis, as are well known in the art. In some cases, visual asset detection may be adaptive, such that user input confirming or selecting the identification of certain features in the 3D image data/mesh may enable machine learning algorithms to detect similar visual assets in the future and/or based on similar conditions, objects, etc. Next, at operation 410, priority value(s) may be assigned to one or more detected visual assets/regions, for example, to enable higher granularity in adaptively retaining resolution in areas of a 3D mesh.

Process 400 may then proceed to scale the cost of the mesh edges/triangles based on the priority values assigned to different regions/assets of the 3D mesh at operation 412. Next, the mesh edges may be sorted by cost at operation 414, and the edges iteratively collapsed or combined until a threshold or target resolution is reached at operation 416. In some aspects, one or more vertices may be moved to further reduce error of the decimation process at operation 418.

Figure 5:
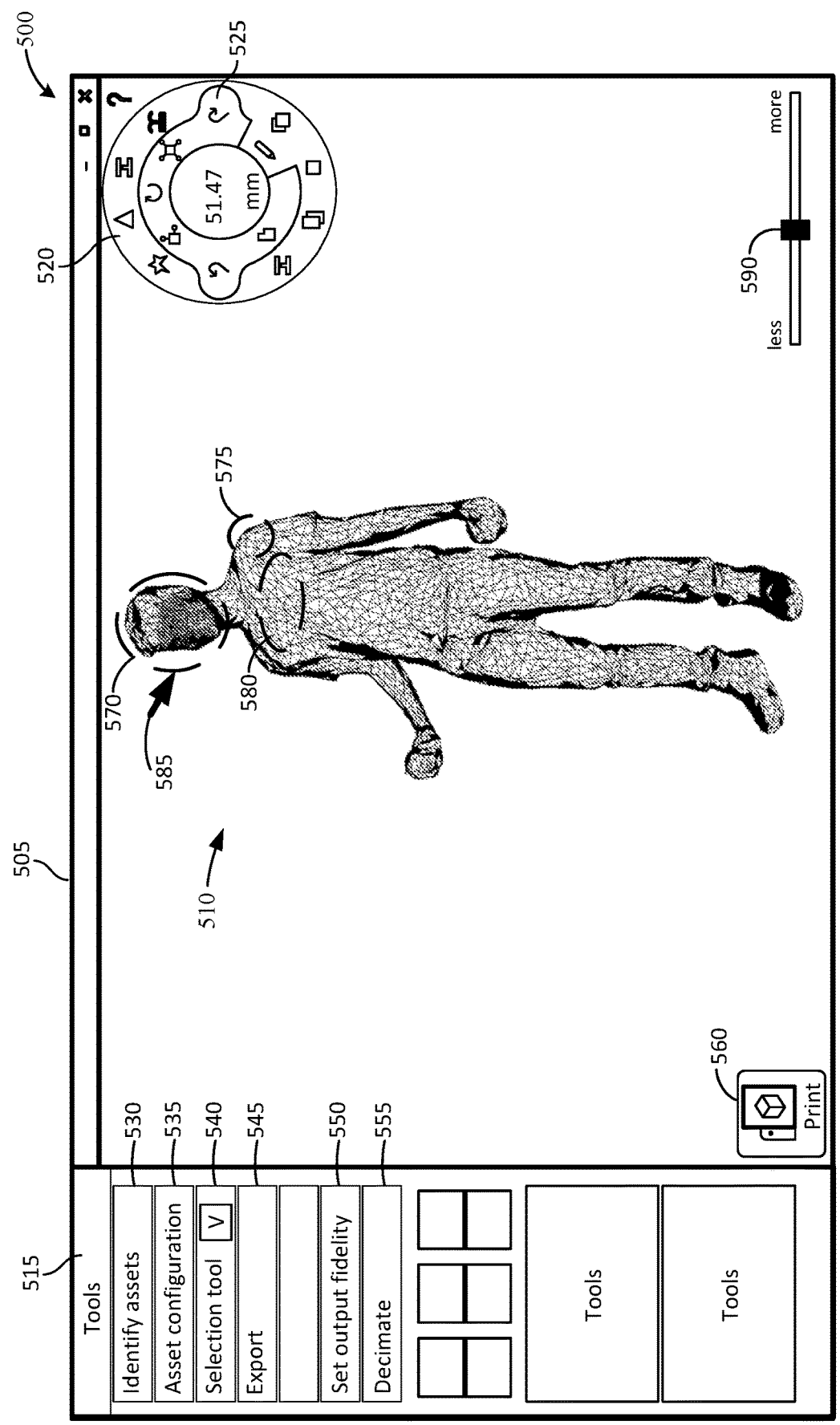
FIG. 5 depicts an example graphical user interface for manipulating and simplifying 3D image data represented by a mesh.

FIG. 5 illustrates an example user interface (UI) 500 with various controls for modeling, manipulating and configuring decimation/geometric simplifications of a 3D mesh/image or video data 510. It should be appreciated that user interface 500 is only given by way of example, and that different configurations of similar controls, interfaces, etc., are contemplated herein.

UI 500 may provide for various controls and tools 515 for identifying features, assets, and/or regions to be associated with a high priority for resolution retention in the above described decimation processes 200 and 400. For example, a manual selector tool 585, selectable via item 540, may enable a user to visually indicate regions of priority, such as by drawing a box or other shape around a specific region 570, 575, 580 of 3D mesh 580. Tools area 515 may provide for various configuration options and operations, such as identify assets 530, asset configuration 535, set output fidelity/resolution 550, and decimate 555, and so on. In some cases, export item 545 may package the 3D mesh for export to another application or device. Similarly, print item 560 may start process 600 for adapting a 3D mesh to a connected or configured 3D printer specification, which will be described in greater detail below. In some aspects, selection of item 560 may send a request to the 3D printer to obtain the capabilities/specifications of the printer, such as x-y axis dimensional accuracy, layer height or heights, and other similar specifications that could affect how precise the 3D printer is able to follow a 3D mesh data 510 in generating a 3D object. It should be appreciated that other decimation related tools, configuration tools, and so on, may be provided in UI 500.

In some aspects, UI may additionally provide for tools 520, 525 for manipulating 3D object/mesh 510, such as panning, zooming, rotating the vantage point, and so on.

In one aspect, the UI 500 may provide a slider or other type of variable control item 590 that may control the sensitivity of the decimation of geometric simplification applied to mesh data 510, For example, moving the slider control sideways (e.g., either left or right) may change the percentage of surface faces that are reduced via decimation in the mesh data 510. In this way, the decimation or other geometric simplification process applied to the mesh data 510 may be easily and in real-time or near-real time visualized for an enhanced and more efficient user experience, including requiring less input steps to effectuate the desired decimated 3D model. In some cases, the UI 500 may also provide a toggle control item 595 or the like for switching between a wire-frame view mode (illustrated in FIG. 5) and a normal or textured mode (3D model of the person represented by wire frame mesh data 510, but instead of lunes, having texture, color, etc.) of visualization of mesh data 510. In some cases, for example, for more intuitive editing, an undo or redo option may be enabled in the UI 510.

Figure 6:
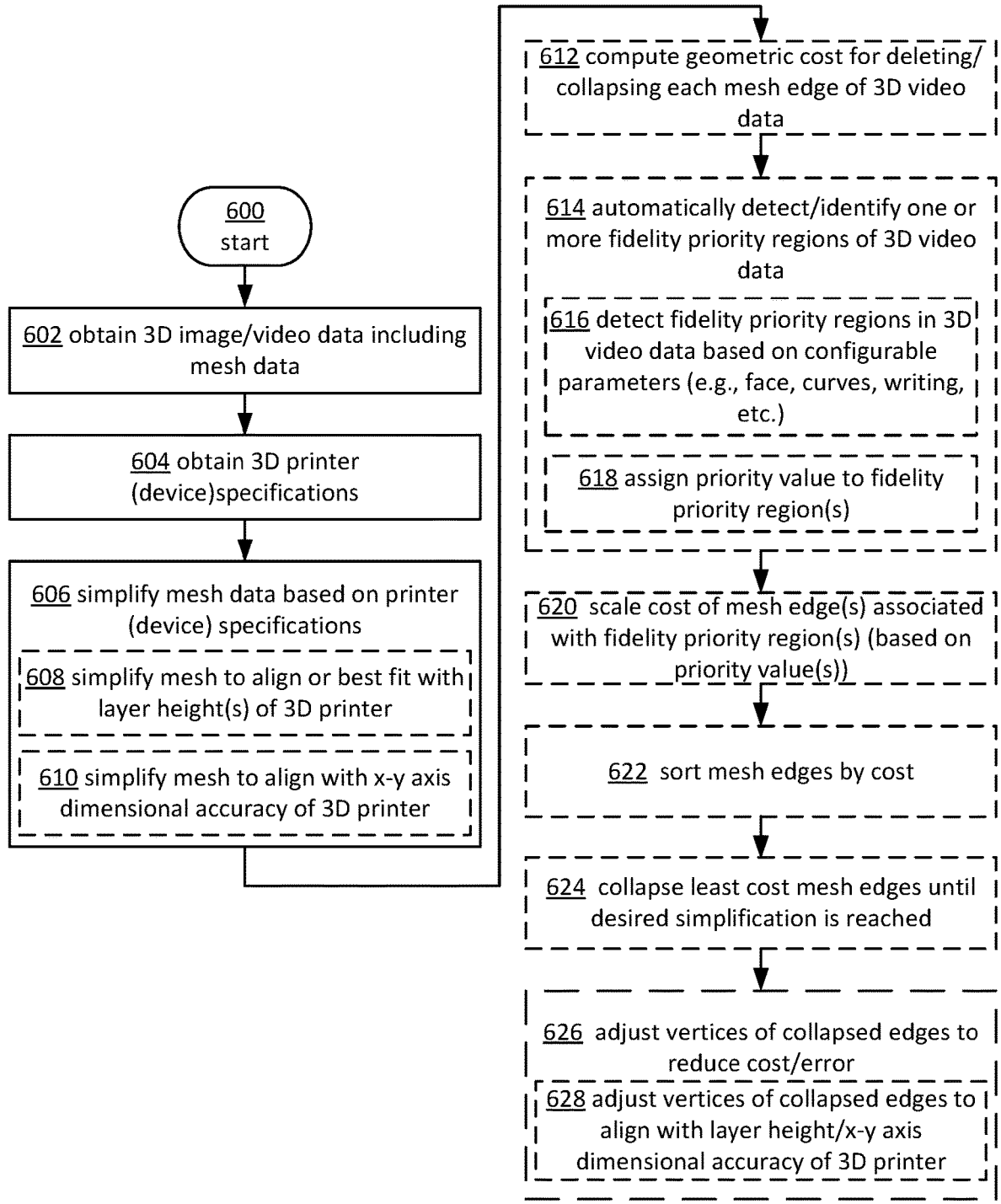
FIG. 6 depicts an example operational procedure for dynamically simplifying 3D image data represented by a mesh based on target device specifications or capabilities.

FIG. 6 illustrates an example process 600 for adaptively decimating a 3D mesh based on capabilities of a target device, and more specifically a 3D printer. In some examples, various operations of process 600 may be similar to similarly labeled operations of process 400. In these cases of similarity, the common operations will not be described in great detail again here. In some cases, 3D video meshes may be much more detailed than 3D printers can represent. At the time a 3D video frame is selected for 3D printing, the 3D mesh may be simplified using detailed capabilities about the target 3D printer.

The operating system, for example of a PC, laptop, etc., may provide a mechanism to query a specific device for its capabilities. In the case of 3D printers, this information is returned in a standard way. This information may provide insight into the "resolution" of the printer—bed size, layer height, path width, etc. These properties can be used to determine the target at which decimation can achieve without noticeable affect for the device targeted. In other aspects, any device able to specify basic capabilities indicating its resolution will help inform the adaption of the decimation algorithm.

After obtaining 3D image or video data and/or converting the data to mesh data at operation 602, process 600 may proceed to operation 604, where 3D printer or other target device specifications or capabilities may be obtained. Next, the 3D mesh data may be simplified based on the 3D printer or device capabilities/specifications, at operation 606. Operation 606 may include collapsing mesh edges or triangles, as described above in reference to operations 212 and 416 of FIGS. 2 and 4. In some cases, operation 606 may further include operations 608 and 610. Operation 608 may include simplifying the mesh data to align or best fit with one or more layer heights that are utilized by the 3D printer for generating 3D objects. Operation 610 may include simplifying the mesh to align with x-y axis dimensional accuracy of 3D printer. It should be appreciated that operations 608 and 610 are given by way of example. Other 3D printer or target device capabilities may be used to optimize mesh simplification in a similar way, such as target device screen resolution, etc.

In some examples, one or more aspects of the described techniques may be applied to CNC machining, such as by obtaining machining specifications of a CNC machine or device and modifying the decimation of the mesh data based on the same. In another example, the above-described techniques may be adapted to synchronize the decimation process and/or parameters with the pixel resolution or other capabilities of a target device, such as mobile device with reduced or otherwise limited resolution. In this way, for example, more aggressive decimation may be performed without any reduction in the quality of the mesh data displayed on the mobile or other device. In one aspect, the geometric simplification process may be adapted for mesh data to be used as a thumbnail icon or other item that may only take up a portion of a device screen, for example, based on an area or portion of the screen that is associated with a specific resolution. In another example, the described techniques may be adapted to specific capabilities of a virtual reality device, such a virtual reality glasses and the like, having specific dimensions/resolution capabilities.

Next, geometric cost for collapsing each edge/triangle may be computed at operation 612. One or more fidelity priority regions may then be detected at operation 614, which may further include detecting fidelity priority regions based on one or more configuration parameter at 616 and assigning priority values to the priority fidelity regions at 618. Next, the cost of the priority fidelity regions may be scaled based on the assigned priority values at operation 610, and the mesh edges/triangles may be sorted by cost at operation 622. Next, the least cost mesh edges/triangles may be collapsed until a desired simplification is reached at operation 624. Next, at operation 626, vertices of the collapsed edges/triangles may be adjusted in location to reduce the error associated with the decimation or simplification. In some cases, operation 626 may further include adjusting vertices of collapsed mesh edges/triangles to align with the layer height and/or x-y axis dimensional accuracy of the 3D printer, or other capability of a target device, at operation 628.

In some cases, process 600 may only optionally include operations 612-624, such that the mesh is only simplified relative to the capabilities of the target device.

Figure 7:
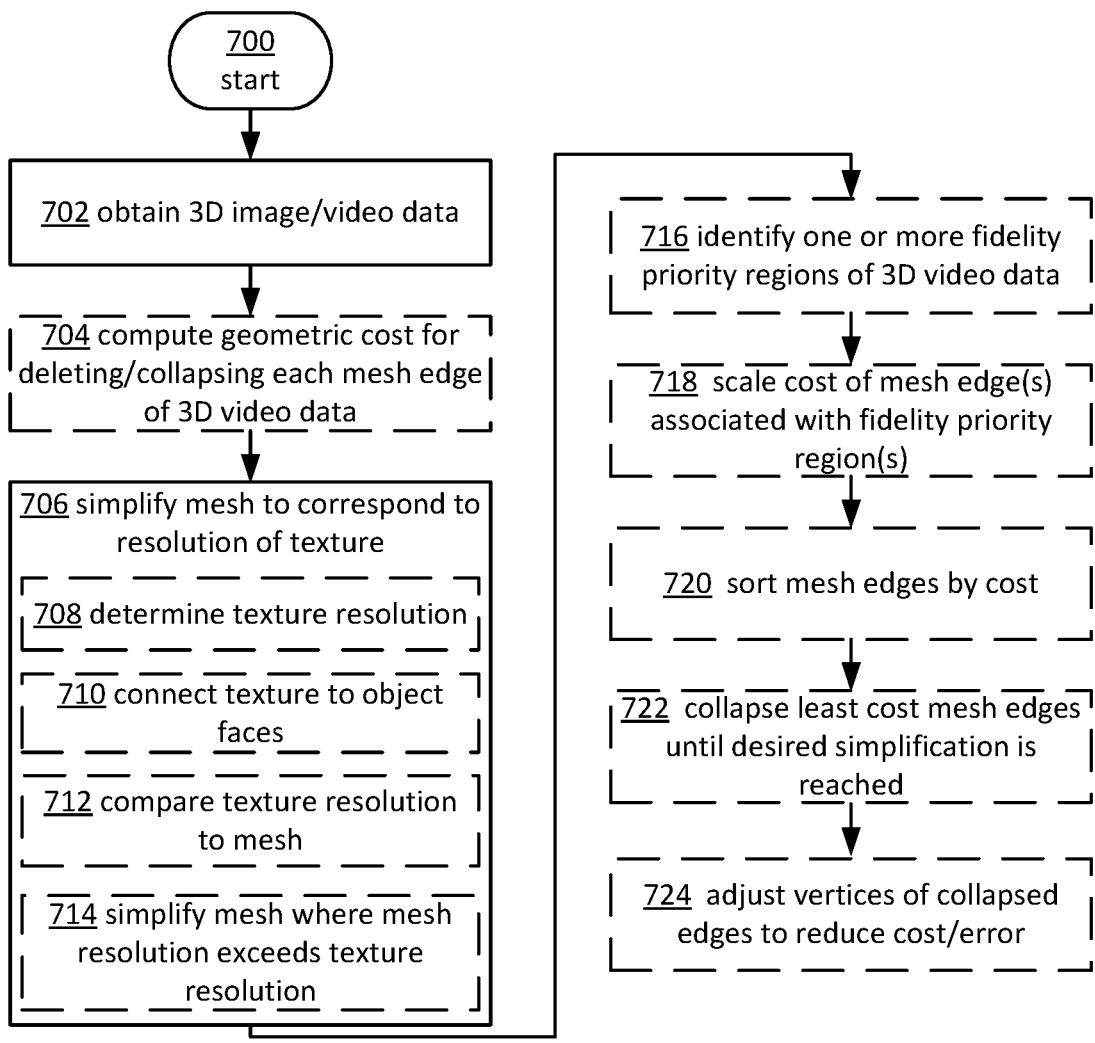
FIG. 7 depicts an example operational procedure for dynamically simplifying 3D image data represented by a mesh based on resolution of texture associated with the mesh.

FIG. 7 illustrates an example process 700 for using texture to inform the geometric simplifications or decimation of 3D mesh data, for example, derived from 3D video data. By connecting appropriate texture to the 3D object faces, the mesh may be efficiently simplified to match the resolution of the texture. Stated differently, texture resolution can be used to determine the minimum target size for the underlying mesh. The connectivity between the texture resolution and the underlying mesh may be taken into account, such that if the resolution of the texture is lower, the mesh may be simplified or reduced to match the texture without showing adverse impact to the viewer/a decrease in the quality/resolution of the 3D mesh data. By tagging video data with information about mesh areas that should not be simplified, or with a weight indicating the value of the detail, process 700 can automatically tune to treat untagged parts more aggressively and throttle back for areas so tagged.

After obtaining 3D image or video data and/or converting the data to mesh data at operation 702, process 700 may proceed to operation 704, where the geometric cost of deleting/collapsing each mesh edge of the 3D video data may be computed. In some aspects, operation 704 may be performed for every mesh edge in the 3D mesh data, or may be performed for a subset of the edges, such as based on areas or portions of the 3D mesh data indicated as higher importance (e.g., by a user via UI 500), based on auto-recognition on faces or other resolution-important features, and so on. Next, at operation 706, the mesh data may be simplified to match or correspond more closely with texture associated with the mesh/video data. In some aspects, operation 706 may further include determining a resolution of the texture at operation 708, connecting the texture to object faces of the 3D mesh data at operation 710, comparing the texture resolution to the mesh data at operation 712, and simplifying the mesh where the mesh resolution exceeds the texture resolution at operation 714. It should be appreciated that in some aspects, one or more of operations 708 through 714 may be performed in a different order to align the mesh resolution with the texture resolution. For example, connecting the texture to the object faces of the 3D mesh data may be performed after the comparing the texture resolution to the mesh data and simplification of the mesh data and/or performed another time after operation 714.

In some aspects, process 700 may proceed to operation 716, where one or more fidelity priority regions may then be detected/identified. Next, the cost of the priority fidelity regions may be scaled at operation 718, and the mesh edges/triangles may be sorted by cost at operation 720. Next, the least cost mesh edges/triangles may be collapsed until a desired simplification is reached at operation 722. In some aspects, at operation 724, vertices of the collapsed edges/triangles may be adjusted in location to reduce the error associated with the decimation or simplification.

In some aspects, process 700 may exclude operations 716 through 724, such that no additional simplification is performed on the 3D mesh after the texture alignment is performed. In other cases, the 3D mesh may additionally be decimated according to capabilities of a target device or application, such as described above in relation to FIG. 6.

Figure 8:
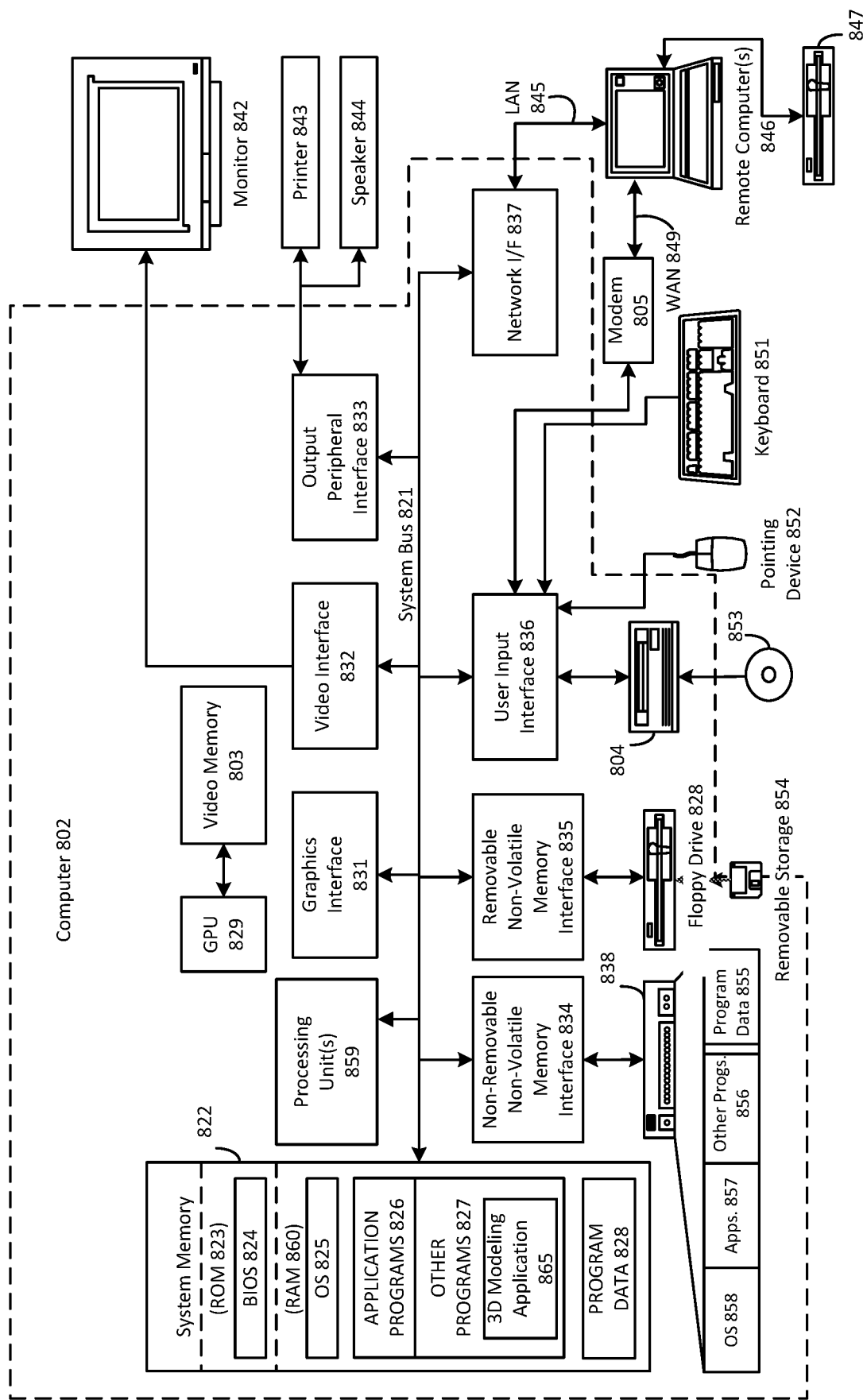
FIG. 8 depicts an example general purpose computing environment in which the techniques described herein may be embodied.

The 3D mesh decimation modeling or builder application/user interface 500 described above, and any of processes 200, 400, 600, and/or 700 may be implemented on one or more computing devices or environments, as described below. FIG. 8 depicts an example general purpose computing environment in which some of the techniques described herein may be embodied. The computing system environment 802 is only one example of a suitable computing environment and is not intended to suggest any limitation as to the scope of use or functionality of the presently disclosed subject matter. Neither should the computing environment 802 be interpreted as having any dependency or requirement relating to any one or combination of components illustrated in the example operating environment 802. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 802, which may include any of a mobile device or smart phone, tablet, laptop, desktop computer, etc., typically includes a variety of computer-readable media. Computer-readable media can be any available media that can be accessed by computer 802 and includes both volatile and nonvolatile media, removable and non-removable media. The system memory 822 includes computer-readable storage media in the form of volatile and/or nonvolatile memory such as read only memory (ROM) 823 and random access memory (RAM) 860. A basic input/output system 824 (BIOS), containing the basic routines that help to transfer information between elements within computer 802, such as during start-up, is typically stored in ROM 823. RAM 860 typically contains data and/or program modules that are immediately accessible to and/or presently being operated on by processing unit 859. By way of example, and not limitation, FIG. 8 illustrates operating system 825, application programs 826, other program modules 827, and program data 828.

The computer 802 may also include other removable/non-removable, volatile/nonvolatile computer storage media. By way of example only, FIG. 8 illustrates a hard disk drive 838 that reads from or writes to non-removable, nonvolatile magnetic media, a magnetic disk drive 839 that reads from or writes to a removable, nonvolatile magnetic disk 854, and an optical disk drive 14 that reads from or writes to a removable, nonvolatile optical disk 853 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 838 is typically connected to the system bus 821 through a non-removable memory interface such as interface 834, and magnetic disk drive 839 and optical disk drive 804 are typically connected to the system bus 821 by a removable memory interface, such as interface 835.

The drives and their associated computer storage media discussed above and illustrated in FIG. 8, provide storage of computer-readable instructions, data structures, program modules and other data for the computer 802. In FIG. 8, for example, hard disk drive 838 is illustrated as storing operating system 858, application programs 857, other program modules 856, and program data 855. Note that these components can either be the same as or different from operating system 825, application programs 826, other program modules 827, and program data 828. Operating system 858, application programs 857, other program modules 856, and program data 855 are given different numbers here to illustrate that, at a minimum, they are different copies. A user may enter commands and information into the computer 802 through input devices such as a keyboard 851 and pointing device 852, commonly referred to as a mouse, trackball or touch pad. Other input devices (not shown) may include a microphone, joystick, game pad, satellite dish, scanner, or the like. These and other input devices are often connected to the processing unit 859 through a user input interface 836 that is coupled to the system bus, but may be connected by other interface and bus structures, such as a parallel port, game port or a universal serial bus (USB). A monitor 842 or other type of display device is also connected to the system bus 821 via an interface, such as a video interface 832. In addition to the monitor, computers may also include other peripheral output devices such as speakers 844 and printer 843, such as a 3D printer, which may be connected through an output peripheral interface 833.

The computer 802 may operate in a networked environment using logical connections to one or more remote computers, such as a remote computer 846. The remote computer 846 may be a personal computer, a server, a router, a network PC, a peer device or other common network node, and typically includes many or all of the elements described above relative to the computer 802, although only a memory storage device 847 has been illustrated in FIG. 8. The logical connections depicted in FIG. 8 include a local area network (LAN) 845 and a wide area network (WAN) 849, but may also include other networks. Such networking environments are commonplace in offices, enterprise-wide computer networks, intranets and the Internet.

When used in a LAN networking environment, the computer 802 is connected to the LAN 845 through a network interface or adapter 837. When used in a WAN networking environment, the computer 802 typically includes a modem 805 or other means for establishing communications over the WAN 849, such as the Internet. The modem 805, which may be internal or external, may be connected to the system bus 821 via the user input interface 836, or other appropriate mechanism. In a networked environment, program modules depicted relative to the computer 802, or portions thereof, may be stored in the remote memory storage device. By way of example, and not limitation, FIG. 8 illustrates remote application programs 848 as residing on memory device 847. It will be appreciated that the network connections shown are example and other means of establishing a communications link between the computers may be used.

In some aspects, other programs 827 may include a 3D modeling or builder application 865 that provides the functionality as described above. In some cases, the 3D modeling application 865 may execute processes 200, 400, 600, and/or 700, and sub-processes and provide a user interface 500, as described above, through graphics interface 831, video interface 832, output peripheral interface 833, and/or one or more monitors or touch screen devices 842. In some aspects, the 3D modeling application 865 may communicate with 3D printer 843 to produce a physical 3D model of the 3D image data, for example, optimized to the capabilities of the 3D printer 843. In some aspects, other programs 827 may include one or more 3D virtualization applications that may obtain and provide images that may be displayed of 3D models generated by 3D modeling application 865.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for geometrically simplifying three-dimensional (3D) video data, the system comprising a processor and memory, the system programmed to perform the following operations:

obtain 3D data of a 3D mesh, wherein the 3D data comprises a plurality of portions associated with a default resolution priority;

associate a higher resolution priority with one or more portions of the plurality of portions of the 3D data;

sort the portions of the 3D data according to resolution priorities associated with the portions;

identify a texture resolution of the 3D data;

connect the texture to surfaces in the 3D data;

compare the texture resolution to the 3D data;

simplify the 3D mesh where the resolution of the 3D mesh exceeds the texture resolution by performing geometric simplification on the sorted portions of the 3D data beginning with portions associated with a least resolution priority and continuing with portions associated with successively higher resolution priorities, the simplification threshold being greater than the texture resolution; and process the simplified 3D data for rendering on the computing device or transmission to another device for display or generation.

2. The system of claim 1, wherein the system is further programmed to perform the following operations:

convert the 3D data into a 3D mesh comprising a plurality of triangles, wherein the plurality of portions of the 3D data comprise one or more triangles of the plurality of triangles, wherein the triangles comprise edges, and wherein the operation of performing the geometric simplification on the sorted portions of the 3D data further comprises:

determining a geometric cost for collapsing at least a subset of the edges of the 3D mesh;

scaling a geometric cost for collapsing edges associated with the one or more portions associated with the higher resolution priority;

sorting the edges of the 3D mesh by geometric cost; and successively collapsing the edges of the 3D mesh associated with a least cost until a desired simplification is obtained.

3. The system of claim 1, wherein the system is further programmed to perform the following operations:

obtain at least one specification of a target device for the 3D data, wherein the at least one specification of the target device further comprises at least one of: a layer height for a target 3D printer, an x-y dimensional accuracy indication for the target 3D printer, a quantized 3D printer coordinate system for the target 3D printer, or a target device screen resolution, and wherein performing the geometric simplification on the sorted portions of the 3D data is based on the at least one specification.

4. The system of claim 1, wherein the surfaces are object faces of the 3D data.

5. A method for geometrically simplifying three-dimensional (3D) video data on a computing device, the method comprising:

obtaining 3D data of a 3D mesh, wherein the 3D data comprises a plurality of portions associated with a default resolution priority;

associating a higher resolution priority with one or more portions of the plurality of portions of the 3D data;

sorting the portions of the 3D data according to resolution priorities associated with the portions;

identifying a texture resolution of the 3D data;

connecting the texture to surfaces in the 3D data;

comparing the texture resolution to the 3D data;

simplifying the 3D mesh where the resolution of the 3D mesh exceeds the texture resolution by performing geometric simplification on the sorted portions of the 3D data beginning with portions associated with a least resolution priority and continuing with portions associated with successively higher resolution priorities, the simplification threshold being greater than the texture resolution; and processing the simplified 3D data for rendering on the computing device or transmission to another device for display or generation.

6. The method of claim 5, wherein the geometric simplification is performed on portions of the 3D data having the successively higher resolution priorities until a target simplification is reached.

7. The method of claim 5, further comprising:
converting the 3D data into a 3D mesh comprising a plurality of triangles, wherein the plurality of portions of the 3D data comprise one or more triangles of the plurality of triangles.

8. The method of claim 7, wherein the triangles comprise edges, and wherein performing the geometric simplification on the sorted portions of the 3D data further comprises:
determining a geometric cost for collapsing at least a subset of the edges of the 3D mesh;
scaling a geometric cost for collapsing edges associated with the one or more portions associated with the higher resolution priority;
sorting the edges of the 3D mesh by geometric cost; and
successively collapsing the edges of the 3D mesh associated with a least cost until a desired simplification is obtained.

9. The method of claim 8, wherein each edge is associated with at least one vertex, and wherein performing the geometric simplification on the sorted portions of the 3D data further comprises:
adjusting at least one vertex of a collapsed edge to reduce a total geometric cost of the geometric simplification.

10. The method of claim 8, wherein scaling the geometric cost for collapsing the edges associated with the one or more portions associated with the higher resolution priority further comprise:
assigning a priority value to each of at least two of the one or more portions associated with the higher resolution priority; and
scaling, by the assigned priority value, the scaled geometric cost for collapsing the edges associated with the one or more portions associated with the higher resolution priority.

11. The method of claim 5, wherein associating the higher resolution priority with the one or more portions of the plurality of portions of the 3D data comprises at least one of:
performing object recognition on the 3D data to identify the one or more portions associated with the higher resolution priority; or
receiving one or more selections indicating the one or more portions associated with the higher resolution priority.

12. The method of claim 11, wherein receiving the one or more selections indicating the one or more portions associated with the higher resolution priority comprises receiving one or more selections via a graphical user interface displaying the 3D data.

13. The method of claim 11, the one or more portions associated with the higher resolution priority comprises one or more curves.

14. The method of claim 5, further comprising:
obtaining at least one specification of a target device for the 3D data, wherein performing the geometric simplification on the sorted portions of the 3D data is based on the at least one specification.

15. The method of claim 14, wherein obtaining the at least one specification of the target device further comprises obtaining at least one of: a layer height for a target 3D printer, an x-y dimensional accuracy indication for the target 3D printer, a quantized 3D printer coordinate system for the target 3D printer, or a target device screen resolution.

16. The method of claim 15, further comprising:
converting the 3D data into a 3D mesh comprising a plurality of triangles, wherein the plurality of portions of the 3D data comprise one or more triangles of the plurality of triangles, wherein the triangles comprise one or more edges, wherein each edge is associated with at least one vertices, and wherein performing the geometric simplification on the sorted portions of the 3D data further comprises:
adjusting at least one vertex of a collapsed edge to reduce a total geometric cost of the geometric simplification based on the at least one of: the layer height for the target 3D printer, the x-y dimensional accuracy indication for the target 3D printer, the quantized 3D printer coordinate system for the target 3D printer, or the target device screen resolution.

17. The method of claim 5, wherein performing the geometric simplification on the sorted portions of the 3D data comprises performing decimation on the 3D data.

18. The method of claim 5, wherein
the surfaces are object faces of the 3D data.

19. The method of claim 18, wherein performing geometric simplification on the sorted portions of the 3D data based at least in part on the resolution of the texture further comprises simplifying the mesh where the mesh resolution exceeds the texture resolution by simplifying at least one portion of the 3D data to align with the resolution of the texture associated with the at least one portion of the 3D data.

20. A computer readable storage device having stored thereon instructions that, upon execution by at least one processor, cause the at least one processor to perform operations for geometrically simplifying three-dimensional (3D) video data, the operations comprising:
obtaining 3D data, wherein the 3D data comprises a plurality of portions associated with a default resolution priority;
associating a higher resolution priority with one or more portions of the plurality of portions of the 3D data;
sorting the portions of the 3D data according to resolution priorities associated with the portions;
identifying a texture resolution of the 3D data;
connecting the texture to surfaces in the 3D data;
comparing the texture resolution to the 3D data;
simplifying the 3D mesh where the resolution of the 3D mesh exceeds the texture resolution by performing geometric simplification on the sorted portions of the 3D data beginning with portions associated with a least resolution priority and continuing with portions associated with successively higher resolution priorities, the simplification threshold being greater than the texture resolution; and
processing the simplified 3D data for rendering on the computing device or transmission to another device for display or generation.

* * * * *